Patented Dec. 18, 1951

2,578,656

UNITED STATES PATENT OFFICE 2,578,656

TETRACHLOROADIPIC ACID

Alfred Jerome Kolka, Birmingham, and Harold David Orloff, Detroit, Mich., assignors to Ethyl Corporation, New York, N. Y., a corporation of Delaware No Drawing. Application August 31, 1950, Serial No. 182,629

1 Claim. (Cl. 260—537)

This invention relates to chlorinated dicarboxylic acids. In particular our invention relates to tetrachloroadipic acid and a process for its manufacture.

Adipic acid itself has been previously prepared by a number of processes. For example, adipic acid has been prepared by the nitration of cyclohexane, wherein it is a secondary product along with the primary product, nitrocyclohexane. Another process for the manufacture of adipic acid comprises the oxidation of cyclohexene by potassium dichromate, potassium permanganate or nitric acid. However, it has not heretofore been possible to prepare by direct or indirect methods the tetra-chlorinated derivative of adipic acid. One such direct method would be the nitration of benzene hexachloride, analogous to the oxidative nitration of cyclohexane. This method is not applicable, as benzene hexachloride is resistant both to nitration and oxidation, and is stable in the presence of fuming nitric acid at elevated temperatures. However, we have provided a direct method for the production of tetrachloroadipic acid by a process analogous to the oxidative cleavage of cyclohexene.

The chlorinated derivatives of adipic acid are useful in many of the applications for which adipic acid has become an important industrial chemical, and in many applications possess advantages over the parent compound. For example, tetrachloroadipic acid can be condensed with hexamethylene diamine in a manner analogous to the condensation of adipic acid. The chlorinated carboxylic acid of our invention, however, possesses the advantage of higher density and greater stability for certain applications. Tetrachloroadipic acid finds further utility, because of the reactive carboxylic groups, as an intermediate wherever it is desired to introduce a highly chlorinated alkyl chain.

It is, therefore, an object of our invention to provide chlorinated adipic acids and in particular, the tetrachlorinated adipic acid wherein each methylene group contains one chlorine atom. It is a further object of our invention to provide a method for manufacturing $\alpha,\beta,\gamma,\delta$-tetrachloroadipic acid.

The novel compound of our invention can be represented by the formula

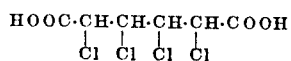

and can also be referred to as 2,3,4,5-tetrachlorohexane-1,6-dioic acid.

The process of our invention is accomplished by oxidative cleavage of 3,4,5,6-tetrachlorocyclohexene-1, hereinafter referred to as benzene tetrachloride, or derivatives thereof wherein other groups are substituted on the carbons of the double bond.

The benzene tetrachloride which we can employ as one raw material in our oxidation process for the manufacture of tetrachloroadipic acid can be prepared directly from benzene, by a process which we refer to as the retarded addition of chlorine to benzene. In this process we treat benzene with chlorine in the presence of an iodine or iodide catalyst while illuminating the reaction zone with actinic light. The product from this chlorination contains a double bond and four chlorine atoms distributed uniformly on the four carbon atoms of the six-membered ring not comprising the double bond. This product is 3,4,5,6-tetrachlorocyclohexene-1 or, more simply, benzene tetrachloride. Furthermore, we can employ other materials resulting from the retarded addition of chlorine to an aromatic nucleus. For example, when chlorobenzene is subjected to addition chlorination as above, 1,3,4,5,6-pentachlorocyclohexene-1, or chlorobenzene tetrachloride, is produced which upon oxidation forms the same tetrachloroadipic acid. In general, our tetrachloroadipic acid can be prepared from material having the general formula

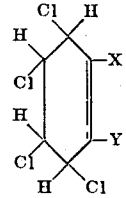

wherein X and Y are the same or different and are selected from hydrogen or substituent groups. By such groups we mean to include, for example, the carboxyl, carbalkoxy, nitro, naphthyl, nitrosyl, phenyl, halogen, thionyl, alkyl and nitrile groups.

The process of our invention will be better understood by reference to the following examples of typical methods of preparing tetrachloroadipic acid. In these examples all parts and percentages are by weight.

Example I

From benzene tetrachloride.—To a reaction vessel, equipped with an agitator and means for supplying heat, was added a suspension of 33 parts of benzene tetrachloride in 560 parts of 50 per cent sulfuric acid. The temperature was raised to 35° C. and 70 parts of solid potassium permanganate was added in five equal portions over a period of three hours. At the end of this time the temperature of the suspension was raised to 80–90° C. for an additional period of one-half hour. The suspension was thereupon cooled to a temperature of 25° C. and sufficient saturated sodium bisulfite solution was added to reduce the manganese oxides formed during the oxidation and bring the manganese salts into solution. The solid organic product was filtered and washed with water, and dried at a temperature of about 80° C. This crude $\alpha,\beta,\gamma,\delta$-tetrachloroadipic acid weighed 29 parts, which corresponds to a yield of 68 per cent of tetrachloroadipic acid, based on the benzene tetrachloride employed. This impure acid was purified by dissolving it in 10 per cent aqueous sodium bicarbonate solution, and treating the solution with "Norit-A" to remove a trace of colored impurities. This mixture was filtered and the water-white filtrate was acidified with dilute hydrochloric acid. The tetrachloroadipic acid precipitated as fine crystals and was filtered and recrystallized from acetone. The yield of pure product was 21 parts or 53 per cent based on the benzene tetrachloride. This material melted at 268–270° C. with decomposition. Analysis showed it contained 49.0 per cent chlorine. The amount of chlorine required by the formula $C_6H_6Cl_4O_4$ is 49.9 per cent. The neutral equivalent of this material was found to be 148. The theoretical neutral equivalent for the dibasic acid $(CHCl)_4(COOH)_2$ is 142.

*Example II*

*From chlorobenzene tetrachloride.*—In an operation similar to Example I, 100 parts of chlorobenzene tetrachloride was treated with 1460 parts of 50 per cent sulfuric acid and to this stirred suspension was added, over a period of one and one-half hours, 184 parts of solid potassium permanganate. The reaction temperature was maintained between the limits of 25 and 30° C. After three hours the solution was heated at a temperature of 90° C. for one-half hour and then cooled to a temperature of 30° C. Solid sodium bisulfite was added as in the above example. The mixture was recovered as above to produce 41 parts of crude tetrachloroadipic acid, representing a yield of 36.6 per cent based upon the amount of chlorobenzene tetrachloride employed. After twice recrystallizing this material from acetone a white powder was obtained which melted at a temperature of 262° C. with decomposition. Analysis showed this material to contain 49.5 per cent chlorine. The theoretical amount of chlorine required by the formula $C_6H_6Cl_4O_4$ is 49.9 per cent. The neutral equivalent of this material was found to be 142, which is identical with the theoretical equivalent required for the dibasic acid $$(CHCl)_4(COOH)_2$$

Tetrachloroadipic acid contains two carboxylic groups of normal reactivity and will, of course, form all the acid derivatives associated with such groups, as for example esters, acid halides, the anhydride, amides and salts. Under suitable conditions such derivatives can be made from either one or both of the carboxylic groups, or each carboxylic group can be converted to a separate derivative.

The above detailed examples of methods of forming the tetrachloroadipic acid of our invention are not intended to limit the process of our invention. For example, other well-known oxidizing agents can be employed such as ozone, periodic acid, hydrogen peroxide, and potassium dichromate to oxidize the benzene tetrachloride. Still other methods of oxidizing benzene tetrachloride will be apparent to those skilled in the art. Still other tetrachlorocyclohexenes will be apparent as raw material for our process.

We claim:

As a new composition of matter $\alpha,\beta,\gamma,\delta$-tetrachloroadipic acid possessing a melting point above about 262° C. and possessing a stable crystalline physical form.

ALFRED JEROME KOLKA.
HAROLD DAVID ORLOFF.

REFERENCES CITED

The following references are of record in the file of this patent:

UNITED STATES PATENTS

| Number | Name | Date |
|---|---|---|
| 2,285,601 | McAllister | June 9, 1942 |
| 2,438,484 | Henne | Mar. 23, 1948 |
| 2,453,146 | McBee et al. | Nov. 9, 1948 |
| 2,554,786 | McBee et al. | May 29, 1951 |

OTHER REFERENCES

Baeyer et al.: Liebig's Ann., vol. 256, p. 27 (1890).

Dufton: J. Chem. Soc., vol. 59, p. 750 (1891).